United States Patent Office 3,244,621
Patented Apr. 5, 1966

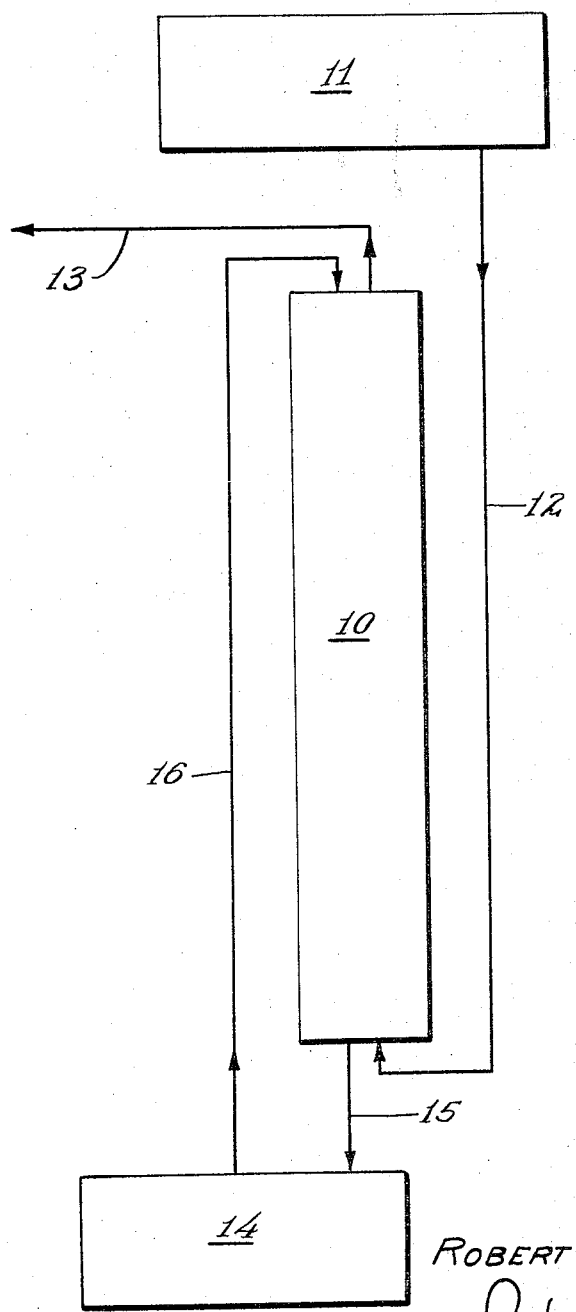

3,244,621
METHOD OF REMOVING ORGANIC MATERIALS
FROM WASTE WATERS
Robert J. Bouthilet, Western Springs, Ill.
(317 Park Ave., Modesto, Calif.)
Filed Sept. 7, 1962, Ser. No. 222,038
9 Claims. (Cl. 210—40)

This invention relates to an improvement in method of removing organic material from waste waters and deals particularly with a system in which the waste waters are passed through a moving bed of activated carbon in counterflow fashion.

Industrial waste waters are, as a rule, processed by either biological or chemurgical means. Some of the wastes may be oxidized directly biologically. However, most of them have to be considerably diluted with water, which is not always freely available. Moreover, such an operation requires considerable material handling and thus becomes rather costly. Furthermore, biological oxidation, or biological removal of contaminants necessarily results in cellular residue, and is often accompanied by the formation of obnoxious odors. The burning of the gases so formed is not the complete answer to this problem, since burning will often result in the formation of smog.

Chemurgical processes are virtually limited to treatments of sludge since extremely few wastes are concentrated enough to readily yield to such a treatment. The separation of sludge from the waste waters entails costly installations and again requires expensive material handling. The esthetics of sludge concentrators also leave much to be desired.

This invention relates to the removal of putrescible material from waste waters by the use of a new technique, where the entire body of the waste material is handled in a simple sequence of steps and where only one handling of the waste is involved.

It is the object of this invention to remove on a single piece of equipment both the soluble organic material and the suspended solids from waste waters.

It is the object of this invention to percolate sewage through a solid liquid contractor of the type described, for example in U.S. Patents Numbers 2,585,490, 2, 528,099, 2,564,717, 2,572,848, 2,709,643, 2,815,322, where the contactor is filled with activated granular carbon of a specific gravity higher than that of the waters to be treated and where the length of the column is determined by the affinity of the impurities to be removed to the sorbent material.

It is a further object of this invention to remove the organic soluble impurities from waste waters in such a manner as to enrich the sorbent material with the impurities in suspension, once the sorbent properties have been exhausted, to a degree, where the impurities will be a sufficient source of energy for the regeneration of the sorbent material.

The main feature of the invention is a technique whereby a sludge filter cake is formed, which contains also at the same time all the organic material orginally present in the sewage. This is greatly different from the prior art where at least two treatments were necessary, or where only one facet or purification was considered.

Granular activated carbon as well as bone char, is regenerated by heating in a furnace and under conditions appropriate to the type of carbon to a temperature of as a rule about 1500° F. To obtain the energy necessary for that, one must usually go to outside sources. This invention, however, utilizes the calorific value of the impurities removed from the processed material held on the carbon to fire the furnace and dry and regenerate the carbon.

Thus an unexpected new effect is obtained, namely the removal of both the soluble organic material and suspended material and the destruction of these contaminants accompanied by an energetic gain sufficiently big to obtain regeneration of the sorbent.

These and other objects and novel features of the present invention will be more clearly and fully set forth in the following specification.

In the drawing forming a part of the present invention, the figure diagrammatically illustrates the method involved.

In general, the method is carried on by the apparatus illustrated in the drawing. The numeral 10 illustrates a "slugging" columnar contactor. The sewage is forced by any suitable means from the waste water reservoir 11 through the conduit 12 leading to the lower end of the columnar contactor. A conduit 13 leads from the top of the columnar contactor 10 through which the product or effluent is transferred.

A furnace 14 is provided for regenerating the carbon. A line 15 is shown leading from the bottom of the columnar contactor 10, indicating that the spent carbon is transferred to the furnace. A second line 16 extends from the furnace to the contactor 10, indicating that the regenerated carbon is returned to the contactor.

The columnar contactor is filled with granular activated carbon. The sewage is run upflow through the confined, normally stationary defined bed of carbon to remove the putrescible material thereby forming a sludge cake. After a predetermined time, the column is slugged and a portion of the carbon removed and transferred to the furnace as is apparent, the entire body of the waste material is handled in a simple sequence of steps, and only one handling of the waste is involved. Both the soluble organic material and the suspended solids are thereby removed in a single operation. The sewage is percolated through a solid liquid contractor filled with activated granular carbon of a specific gravity higher than that of the waters to be treated and where the length of the column is determined by the affinity of the impurities to be removed to the sorbent material. The organic soluble impurities enrich the sorbent material with impurities in suspension, once the sorbent properties have been exhausted, to a degree, where the impurities will be a sufficient source of energy for the regeneration of the sorbent material.

A small amount of the spent carbon is heated to a high temperature as for example 1200° F. by a gas flame or other suitable means. After the body of carbon is thus heated, the flame is turned off, and additional spent carbon is introduced, the impurities carried by the carbon maintaining combustion until all of the carbon is regenerated. Thus the putrescible material is destroyed while in the process of regenerating the carbon. My invention, instead of requiring outside sources for regeneration of the carbon by heating, utilizes the caloric value of the impurities removed from the processed material held on the carbon to fire the furnace and dry and regenerate the carbon. The effect obtained is removal of both the soluble organic material, and the destruction of these contaminants accompanied by a gain in energy sufficiently large to obtain regeneration of the sorbent.

As specific examples of the process, the following may be listed:

*Example 1*

Waste waters of a cannery during the tomato processing season were collected at hourly intervals for two days and a total of twelve hundred gallons was collected. The material was kept from putrefaction by bleeding in diethylpyrocarbonate at a rate to keep a permanent level of ten parts per million. The collected material was then run through a "slugging" columnar contactor filled with granular activated carbon manufactured by the Pittsburgh Chemical Company and marketed under the designation of CAL. The apparent density of the dry material was 0.454, its molasses number was 251, the iodine number 1004 and it had an ash content of 6.31 percent. The dimensions of the column were six inches internal diameter and the total bed depth was twenty-five feet of carbon. The collected sewage was run upflow at a rate of two hundred gallons per hour. Samples of the effluent water were taken intermittently from the top of the column for later BOD analysis. The input BOD was 900 p.p.m. and the highest value found in the effluent was 30 p.p.m.

After the passage of the twelve hundred gallons of the material, the column was slugged and a linear depth of 4.5 feet of the carbon removed. The spent carbon was analyzed and it was found that the portion removed from the column had sorbed 10.12 lbs. of solids. This spent carbon was then introduced into an improvised kiln by small portions. The first portion consisting of half a pound of the spent material was heated to 1200° F. with commercial gas flame and when this temperature was reached, the flame was shut off and further spent carbon was fed into the furnace. This was continued until all the carbon was regenerated. Examination of the regenerated carbon shows a molasses number of 249 and an apparent density of the water-quenched and dried material of 0.453. The material can thus be considered well regenerated and, as further runs have shown, the activity remained about the same. It is important to point out that all of the slugged out carbon has to be at one time in the furnace since the material with most sorbed organic material enters first, and all of the carbon has to be given the benefit of heating; the sorbed material is the source of the heat.

*Example 2*

Waste waters of a dairy were collected and their BOD determined and found to be 1700 p.p.m. This sewage was run at a rate of 160 gallons per hour through the column described in Example 1 and the effluent BOD analyzed. It was found to be 20 p.p.m. The effluent was also found to be odorless and save for a very slight saltiness, tasteless.

*Example 3*

Phenol and related compounds, generally referred to as phenolics are the main contaminants oil refineries have to eliminate prior to the discharge of their waste waters into the watershed. Up to now it has been held that biological oxidation is the best answer to the problem. It was found, however, that by passing such waste waters through a moving column of carbon in a sense contrary to the movement of the carbon, it was possible to retain both the phenolics and the suspended material on the column.

A column 25 feet high and six inches in diameter was filled with granular carbon and refinery waste waters percolated through its upflow. The rate of flow was 240 gallons per hour. The column was slugged every half an hour and five inches of the bed were removed every time. The effluent was found to be free of contaminants and the slugged carbon was regenerated without an outside source of heat, save for the very initial ignition of the sorbed waste. Where normally the sequence of changes from phenol to catechol to succinic acid to acetic acid and so down to carbon dioxide and water is employed, it was found possible to sorb the impurities directly from their water solution and at the same time also filter out the suspended matter. The suspended matter was held at the bottom of the column, i.e., it was held at that carbon which no longer had available active sorbent sites. The amount of combustible material held on the lower part of the column was more than that necessary for regeneration. Calculation shows that enough energy will be available for pumping.

*Example 4*

Pulp mill waste waters were passed upflow through a 25 foot tall column of a diameter of six inches packed with granular carbon and the BOD of the effluent determined. It was found to be 20 p.p.m. The rate of flow was 150 gallons per hour.

Samples were taken frequently from the bottom of the column and sorbed solids determined. This determination included also the filtered out solids. Depending on the time interval more or less foreign material was found to adhere to the removed carbon. A range of .5% to 32% of the total weight of the carbon has been found.

When the carbon was experimentally regenerated, it was found that up to 3% of foreign solids it was necessary to employ outside heat to get any regeneration whatever. A not quite satisfactory regeneration by combustion of the sorbed solids was obtained between 3 and 5% and over 5% a satisfactory regeneration was achieved.

*Example 5*

Twenty-nine gallons of still slops from a winery were collected in a tank and the BOD was determined on these slops. The BOD was 30,000 parts per million or above. The putrescibile material made the composition of these slops to a jell-like colloidal suspension. These slops had a pH of approximately 2.3 due to excessive soluble tartaric acid.

To the initial one thousand gallons lime, $Ca(OH)_2$, was added to bring the pH to 7. This also precipitated the tartaric acid. This material was passed up-flow through a continuous countercurrent carbon column containing CAL carbon as in the previous examples at a rate of 600 gallons per hour. The size of this column was 20 feet high and 10 inches in diameter.

The affluent BOD was 7 parts per million. It was found in the continued use of the regenerated carbon from this affluent that no additional lime may be added as the carbon itself then provided both absorptive properties and lime treatment from the lime adhering.

As is apparent my process removes on a single piece of equipment both the soluble organic material and the suspended solids from waste waters. A main feature of the invention is the technique whereby a sludge filter cake is formed, which contains also at the same time all the organic material originally present in the sewage. This is greatly different from the prior art, where at least two treatments are necessary, or where only one facet or purification is considered.

An important point in this application is the fact that other known inventions use a carbon bed which is generally moving to absorb contaminating substances from solution, while in my invention I make use of the graded filtering ability of the carbon to load the carbon to a sufficient extent to provide fuel. As will be evident it is only by means of the upward flow that this can be achieved. The carbon functions as a mechanical filter at the outset and as a chemical absorbent at the top of the column of carbon.

In accordance with the patent statutes, we have described the principles of construction and operation of our improvement in method of removing organic material from waste waters, and while we have endeavored to set forth the best embodiment thereof, we desire to have it understood that changes may be made within the scope of the following claims without departing from the spirit of our invention.

We claim:

1. A method of removing organic material capable of maintaining combustion at a temperature below that of carbon from waste waters, the sequence of steps including, passing the waste waters upwardly through a confined normally stationary defined bed of activated carbon from inlet to outlet thereof, adsorbing organic material from the waste waters on the carbon, particularly at the inlet end of the bed, to form a sludge cake, employing the carbon sludge cake at the inlet end of the bed which no longer exhibits appreciable sorbent properties as a physical filter to retain the suspended matter and dispersed sludge, removing at least a portion of the carbon from the inlet end of the bed, heating the activated carbon removed to a temperature at least equal to the temperature at which the organic material will maintain combustion, removing the source of heat and using the sorbed and mechanically held organic material as a fuel source of energy for the regeneration of the spent carbon.

2. The method of claim 1 and in which the waste waters originate in the processing of food.

3. The method of claim 1 and in which the waste waters originate in the processing of milk.

4. The method of claim 1 and in which the waste water are those developed during petroleum refining.

5. The method of claim 1 and in which the waste waters are those developed during pulp and paper manufacture.

6. A filtering process for use in removing organic waste material from waste waters, the organic material being capable of maintaining combustion at a temperature below the temperature at which carbon will burn when absorbed on charcoal in a sufficient proportion to maintain combustion, the process including the steps of:

flowing the waste waters containing the organic material through a bed of activated carbon until said sufficient proportion of said organic material is adsorbed and occluded thereupon, heating the activated carbon and organic material with a heat source until the temperature thereof at least equals the temperature necessary to maintain limited combsution of the organic material, and withdrawing the heat source while maintaining combustion until the carbon is reactivated.

7. The process of claim 6, and including the step of adding lime to the normally acid organic material to at least neutralize the organic material in solution, and retaining the lime with the carbon after the burning of the organic material.

8. A method of removing combustible organic material from waster waters including the steps of:

flowing waste waters through a bed of activated carbon, the waste waters including organic material capable of maintaining combustion when present on the carbon in a predetermined proportion which is capable of being adsorbed and occluded by the carbon, heating the carbon and attached and adsorbed material to a temperature sufficient to maintain controlled combustion with an initial source of heat, withdrawing the heat source while still maintaining combustion, and adding additional carbon having said predetermined proportion of heterogeneous organic material thereon while still maintaining combustion in the absence of said heat source.

9. The method of claim 8, and in which the absorbed organic material comprises at least three percent by weight of the carbon heated.

References Cited by the Examiner
UNITED STATES PATENTS

| | | | |
|---|---|---|---|
| 506,880 | 10/1893 | Jewell | 210—179 |
| 2,008,144 | 7/1935 | Morrell | 252—421 |
| 2,008,145 | 7/1935 | Morrell | 210—39 |
| 2,213,330 | 9/1940 | Wahlstrom | 210—39 |
| 2,851,428 | 9/1958 | Wayne et al. | 252—416 |
| 2,969,297 | 1/1961 | Grosvenor | 210—40 |
| 2,973,319 | 2/1961 | Porter | 210—33 |
| 3,150,105 | 9/1964 | Ledding | 252—416 |

FOREIGN PATENTS

| | | |
|---|---|---|
| 688,064 | 2/1953 | Great Britain. |

MORRIS O. WOLK, *Primary Examiner.*